UNITED STATES PATENT OFFICE.

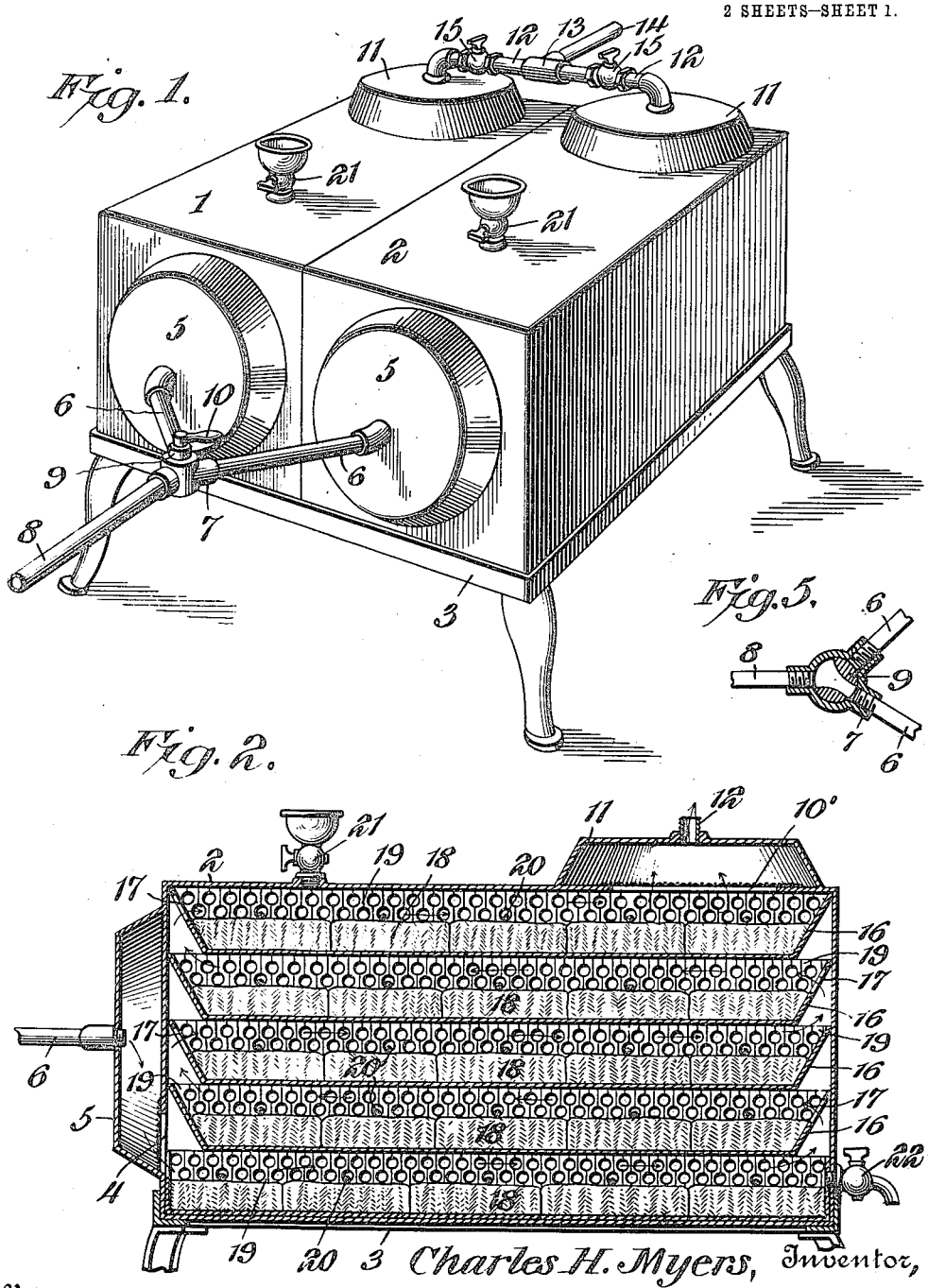

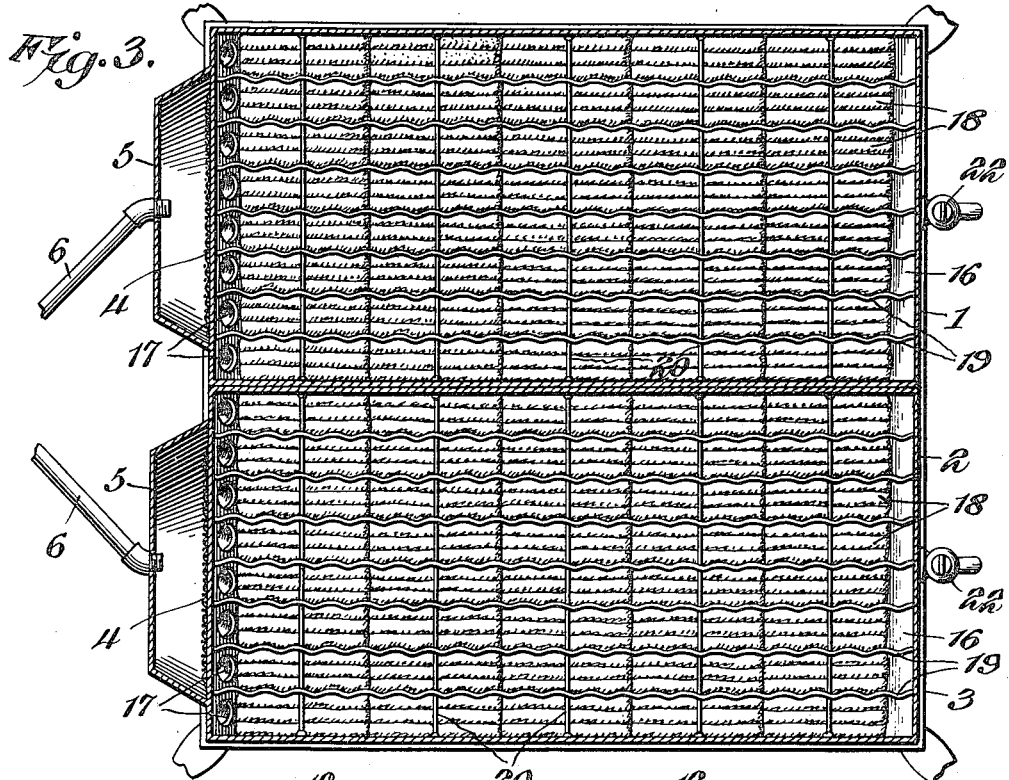
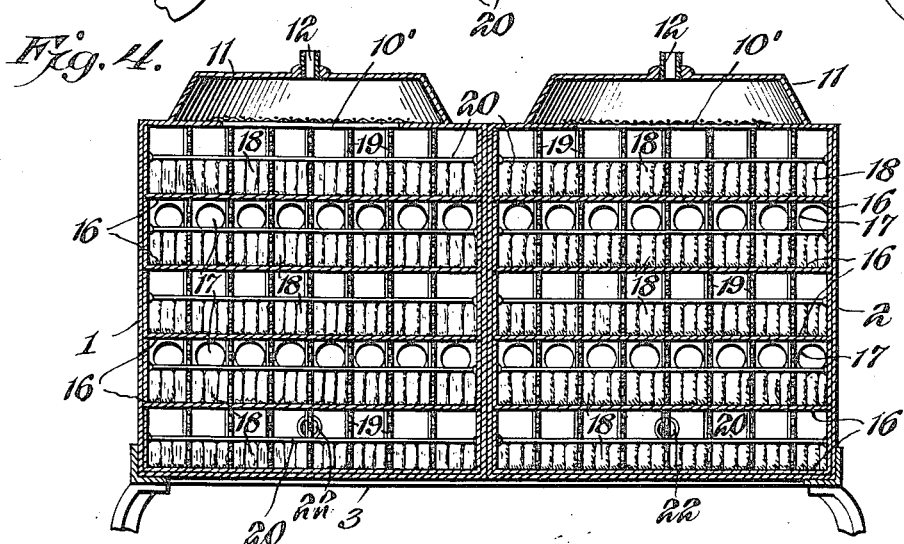

CHARLES H. MYERS, OF BUFFALO, NEW YORK.

CARBURETER FOR HOUSEHOLD AND OTHER USES.

1,075,598. Specification of Letters Patent. Patented Oct. 14, 1913.

Application filed February 24, 1910, Serial No. 545,774. Renewed March 8, 1913. Serial No. 753,074.

*To all whom it may concern:*

Be it known that I, CHARLES H. MYERS, a citizen of the United States, residing at Buffalo, in the county of Erie and State of New York, have invented a new and useful Carbureter for Household and other Uses, of which the following is a specification.

This invention is a carbureter for use in producing gas for household purposes from volatile oils or hydrocarbons, and consists in certain novel features which are illustrated in the accompanying drawings and will be hereinafter first fully described and then pointed out in the claims.

In the drawings, Figure 1 is a perspective view of a carbureter embodying my invention. Fig. 2 is a vertical longitudinal section of the same. Fig. 3 is a horizontal section thereof. Fig. 4 is a transverse vertical section thereof. Fig. 5 is a detail view of a two-way valve which is employed in connection with the carbureter.

In carrying out my invention, I employ a housing which is preferably constructed in two twin members 1 and 2 which may be supported upon a platform or base 3. Each of the twin members comprises an external housing or casing having an air inlet 4 at one end over which is a hood 5 into which leads an air pipe 6 which is connected with any convenient form of blower so as to force air under pressure into the device. The pipes 6 of the two members extend to a union 7 from which a main supply pipe 8 leads to the blower which is omitted from the drawings, as it may be of any convenient type and forms no part of my invention. Within the union or coupling 7 is mounted a two-way valve 9 which is provided with a suitable handle 10 and may be turned so as to admit the air into either member of the apparatus or to cut off the flow from both members, as will be readily understood. This valve is of ordinary type and its operation will be readily understood on reference to Fig. 5 without a detailed description of the same.

In the top of each member of the apparatus, at the end opposite the air inlet, is a gas outlet 10' over which is a hood 11, and from the said hood an outlet pipe 12 passes to the point of use. The pipe 12 leading from each member passes to a union or coupling 13 from which a main 14 passes to carry the gas to any point or series of points within the building where it is to be used for illumination, heating or cooking. Within each pipe 12 is a valve 15 which may be of any desired form so as to cut off or permit the flow of the gas to the main 14, as will be readily understood.

Within each member of the apparatus, I provide a series of superposed pans or compartments 16 which extend from end to end and side to side of the housing or casing and have their ends inclined downward and inward from the ends of the housing, and the opposite ends of the alternate pans are provided with openings 17 to permit the oil to flow downward through the several compartments when the device is to be charged and also to permit the air to flow successively over the several compartments when the device is in use. Within the several compartments, I provide an absorbent packing or oil-holding material 18, the height of the said packing or absorbent material being about equal to one half the height of the pan or compartment in which it is placed. A series of longitudinal partitions 19 is provided within each pan or compartment, and these partitions are transversely perforated to permit the oil to circulate freely through the same, while transverse rods 20 are secured within the pans or compartments so as to retain the absorbent material within the compartments and prevent it being carried therefrom by the suction of the air passing over the same.

In the top of each member of the apparatus is an oil inlet 21 provided with a suitable cut-off valve and in the wall of each member is a stop cock or drip 22 which is arranged substantially in the plane of the surface of the absorbent material in the lowermost pan or compartment, so that when the device is being charged with oil, the operator will be notified when the several absorbent packings have been saturated by oil dripping through the said stop cock, whereupon the supply will, of course, be cut off and the said stop cock 22 closed. The valve in the oil inlet will, of course, be closed so as to retain the oil and the vapor generated therefrom within the carbureter and prevent loss of the same through leakage due to the said valve being left open.

The operation and advantages of my apparatus will be readily understood from the foregoing description, taken in connection with the accompanying drawings.

Air is admitted under pressure through the pipe 8 and either one of the pipes 6 so as to pass through the air inlet 4 and, consequently, follow a tortuous passage over the surface of the absorbent oil holders in all the compartments and, by vaporizing the said oil and absorbing the vapor, generate a rich gas which will flow through the outlet pipes 12 and 14 to the point of consumption. The burners will preferably be equipped with additional air valves so that they may be readily regulated to obtain the desired quality of flame. In practice, both members of the apparatus will be fully charged with oil and the valves 15 will be both closed and the valve 9 disposed to cut off the entrance of air. When it is desired to use gas, one of the valves 15 is opened and the valve 9 is turned so as to connect the main air pipe 8 with the pipe 6 leading to that member of the apparatus, the outlet from which has been opened by turning the valve 15. The blower or air compressor having been started, the air under pressure will be forced through the apparatus and will, consequently, generate gas in the described manner, which will pass off through the main 14 for use. Should the weakening of the flame give notice that the supply of gas is running short, the valve 9 is turned so as to cut off the flow of air from the member which has been in use and direct the air into the other member. The valve 15 is then closed and the other valve 15 opened, so that the formerly negative member of the apparatus will supply the gas and the one which has been depleted will be re-charged. It will thus be seen that I provide for a continuous supply of gas and that either member may be charged while the other member is in use, without in any way affecting the active member or impairing the efficiency of the same, or lowering the quality of the gas supplied.

My device is exceedingly simple in its construction and the arrangement of its parts, and can be supplied at little expense so that it may be readily installed, and its use will provide a high grade of gas of constant quality safely and economically.

In my application No. 545773, filed Feb. 24, 1910, for a carbureter for stationary engines and other purposes, certain features herein shown are shown and described and also claimed, and consequently no claim is made herein broadly to such features.

Having thus described the invention, what I claim as new, and desire to secure by Letters Patent, is:—

1. In a carbureter for household and other uses, twin housings each provided with receptacles for volatile liquid, said receptacles being disposed in superposed order and each containing absorbent material with a free air space overlying the exposed surface of the absorbent material, the air space of one receptacle communicating at one end with the corresponding end of the air space of the next receptacle in order, a hood at the air inlet end of each casing, a hood at the outlet end of each casing, a branched air pipe communicating with both air inlet hoods, a branched pipe communicating with both air outlet hoods, a valve in the air inlet pipe movable to connect either hood with the air inlet pipe at will, separate valves in the branches of the air outlet pipe and independent filling means individual to the respective casings.

2. In a carbureter for household and other uses, the combination of a housing having an air inlet opening at one end and an outlet opening at the opposite end, a hood over each opening, an inlet pipe to one opening, an outlet pipe to the other opening, means for supplying a volatile liquid to the housing, and a series of superposed pans within the housing and having their ends inclined inward and downward from the end walls of the housing, each pan being co-extensive with the internal cross sectional area of the housing, and absorbent material within each pan having its exposed surface stopping short of the edges of the walls of the pan, the space above the absorbent material being free and unobstructed and the pans each at one end having passages leading into the space between the walls of the housing and the inclined ends of the pans.

3. A carbureter for household and other uses provided with a housing having an inlet at one end and an outlet at the other, and a series of superposed pans within the housing each of co-extensive area with the internal cross sectional area of said housing and having its opposite ends inclined inward and downward from the walls of the housing, each pan having one inclined end perforated and containing absorbent material having its exposed surface stopping short of the outer edge of the pan, the pans defining a tortuous and otherwise free passage from the inlet of the housing to the outlet thereof.

4. The combination of a housing having an air inlet opening at one end and an outlet opening at the opposite end, hoods over the said openings, a gas outlet pipe rising from the hood over the outlet opening, a pipe entering the hood over the inlet opening and adapted to admit air under pressure thereto, a series of superposed pans within the housing each of coextensive area with the internal cross sectional area of said housing and having their ends inclined inward and downward from the ends of the housing, the alternate pans having passages through their opposite inclined ends, absorbent material within the said pans coextensive in area therewith and stopping short of the tops of the respective pans to provide free air passages over said absorbent material, and means for supplying volatile liquid to said absorbent material.

5. The combination of a housing having an air inlet at one end near its bottom, and a gas outlet at its opposite end at its top, superposed pans within the housing each having the outer edges of its sides and ends in contact with the respective side and end walls of the housing, the ends of the pans being inclined downward and inward from the end walls of the housing and the opposite ends of alternate pans being perforated near their upper edges, perforated partitions disposed longitudinally in the several pans and of equal height therewith whereby to support the superposed pans, absorbent holders within the pans having their upper surfaces below the perforations in the ends of the pans, transverse rods secured in the pans and bearing upon said absorbent holders, and means for supplying volatile liquid to said holders.

In testimony that I claim the foregoing as my own, I have hereto affixed my signature in the presence of two witnesses.

CHARLES H. MYERS.

Witnesses:
JOHN H. SIGGERS,
DAVID R. WAGNER.